United States Patent [19]

Maruyama

[11] Patent Number: 5,496,939
[45] Date of Patent: Mar. 5, 1996

[54] METHOD FOR PRODUCING COPPER PHTHALOCYANINE USING THIOLS

[75] Inventor: Kazuhiro Maruyama, Kawasaki, Japan

[73] Assignee: Kawasaki Kasei Chemicals Ltd., Tokyo, Japan

[21] Appl. No.: 400,863

[22] Filed: Mar. 8, 1995

[30] Foreign Application Priority Data

Mar. 16, 1994 [JP] Japan .................................. 6-045293
Dec. 28, 1994 [JP] Japan .................................. 6-326916

[51] Int. Cl.$^6$ ........................... C09B 47/04; C09B 47/06
[52] U.S. Cl. ......................... 540/139; 540/140; 540/142; 540/144
[58] Field of Search ..................................... 540/140, 139, 540/142, 144

[56] References Cited

U.S. PATENT DOCUMENTS

| | | | |
|---|---|---|---|
| 4,906,747 | 3/1990 | Segawa et al. | 540/144 |
| 5,153,314 | 10/1992 | Segawa et al. | 540/144 |
| 5,318,623 | 6/1994 | Azuma et al. | 540/142 |

FOREIGN PATENT DOCUMENTS

| | | |
|---|---|---|
| 0443107 | 8/1991 | European Pat. Off. . |
| 0148800 | 11/1979 | Japan . |

*Primary Examiner*—Mukund J. Shah
*Assistant Examiner*—Pavanaram K. Sripada
*Attorney, Agent, or Firm*—Oblon, Spivak, McClelland, Maier & Neustadt

[57] ABSTRACT

A method for producing copper phthalocyanine, which comprises heating and reacting phthalic acid or a phthalic acid derivative, urea or a urea derivative, and a copper compound, using molybdenum or a molybdenum compound as a catalyst, in the presence or absence of an inert organic solvent, wherein at least one compound selected from the group consisting of an aromatic dithiol compound of the following formula (I), a saturated aliphatic dithiol compound of the following formula (II), and their precursors, or at least one compound selected from the group consisting of a ruthenium compound and an osmium compound, is added to the reaction system:

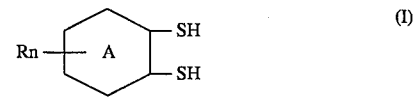

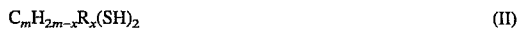

wherein ring A in the formula (I) is a 6-membered single carbon ring or polycyclic condensed carbon ring aromatic compound, R for $R_n$ in the formula (I) or for $R_x$ in the formula (II) is a mercapto group (—SH), a substituted mercapto group (—SR' wherein R' is a substituent inert in the reaction system), or a substituent substantially inert in the reaction system, m is an integer of from 2 to 4, and n and x are optional integers of from 0 to the maximum number of substitutable positions of the respective compounds other than the positions for the mercapto groups.

9 Claims, No Drawings

METHOD FOR PRODUCING COPPER PHTHALOCYANINE USING THIOLS

The present invention relates to a method for producing copper phthalocyanine which contains little impurities and free copper and whereby pigmentation is very easy.

A method for producing copper phthalocyanine which comprises heating phthalic acid or a phthalic acid derivative (hereinafter referred to as "phthalic acid or its derivative"), urea or a urea derivative (hereinafter referred to as "urea or its derivative") and a copper compound in the presence of a phthalocyanine-forming catalyst such as a molybdenum compound in an inert organic solvent, is known as an industrially established method. In this method, it is common to employ phthalic anhydride or phthalimide as the phthalic acid or its derivative, urea as the urea or its derivative, and cuprous chloride as the copper compound.

In order to obtain copper phthalocyanine useful for pigmentation by this method, it is industrially common to employ a post treating method wherein after completion of the reaction under heating, the solvent is distilled off under reduced pressure from the reaction product, and the obtained residue is washed with hot water.

As the stoichiometrical amount of the chemical reaction in the above-mentioned common method for producing copper phthalocyanine, the copper compound is required in an amount of ¼ mol per mol of the phthalic acid or its derivative. However, it has been common to employ the copper compound in an amount of from 1.2 mol time (Japanese Examined Patent Publication No. 32886/1977) to 0.9 mol time (Japanese Unexamined Patent Publication No. 161489/1991) of the stoichiometrical amount in an attempt to increase the yield of the copper phthalocyanine compound and to minimize the content of free copper contained in the obtained copper phthalocyanine compound.

In a usual method for producing a copper phthalocyanine compound, after completion of the reaction under heating, the solvent is distilled off under reduced pressure from the reaction product, and the obtained residue is washed with hot water, whereby the quality attainable by the usual operation is such that the resulting copper phthalocyanine compound has a purity of from 90 to 96% and contains from 0.21 to 1.2% of free copper. However, in such copper phthalocyanine, non-reacted reactants and impurities are likely to remain in substantial amounts, which tend to cause troubles in the subsequent pigmentation. As the pigmentation, a dry milling method (Japanese Unexamined Patent Publication No. 320458/1992) may, for example, be mentioned which is a pigmentation method which comprises dry pulverization, followed by treatment with a solvent. In such a dry milling method, if the above-mentioned impurities are present, a crystal transformation rate usually tends to be slow, whereby deterioration is observed in the quality of pigmentation such as clearness or a tinting degree.

Further, in recent years, in a case where treatment such as pigmentation of copper phthalocyanine is to be carried out, it is required that metal ions of e.g. a copper compound should be as little as possible in the waste liquid discharged from the treatment.

It is economically preferred to use copper phthalocyanine obtained by the reaction in such a quality that after the reaction, the solvent is distilled off, and the product is simply washed with hot water. However, if the purity is low and the free copper is substantial, as mentioned above, such will be problematic from the environmental viewpoint and in the use of the product. Especially, copper ions contained in waste water are likely to cause environmental pollution and therefore are regulated by law.

For the purpose of further improving the purity of the above-mentioned copper phthalocyanine washed with hot water and reducing free copper, washing with an acid may be carried out using e.g. dilute sulfuric acid, whereby it is usually possible to obtain a product having a purity of at least 97% and a free copper content of from 0.2 to 0.5%. However, there are still drawbacks that the yield of the product deteriorates due to such washing with the acid, and a further step of neutralizing the acid used is required. Further, there is a drawback that copper ions corresponding to free copper thereby reduced, will elute into the washing filtrate to increase the load in the step of removing copper ions.

Accordingly, it is an object of the present invention to reduce the amount of impurities over the conventional method for producing copper phthalocyanine and thereby to provide a method for producing a product which contains little free copper and whereby crystal transformation is easy in pigmentation such as a dry milling method.

The present inventors have studied impurities in a so-called Wyler method which is a conventional method for producing copper phthalocyanine, and as a result, have found that impurities extracted by N,N-dimethylformamide (hereinafter referred to simply as DMF) remarkably impair the crystal transformation rate in pigmentation, particularly in the solvent treatment in a dry milling method. On this basis, an effective method for production has been researched using the amount of such impurities as an index, and as a result, it has been possible to solve the above problems by adding a very small amount of a certain specific dithiol compound such as 1,2-benzenedithiol, or a ruthenium compound and/or an osmium compound to the reaction system. On the basis of these discoveries the present invention has been accomplished.

Thus, the present invention provides a method for producing copper phthalocyanine, which comprises heating and reacting phthalic acid or a phthalic acid derivative, urea or a urea derivative, and a copper compound, using molybdenum or a molybdenum compound as a catalyst, in the presence or absence of an inert organic solvent, wherein at least one compound selected from the group consisting of an aromatic dithiol compound of the following formula (I), a saturated aliphatic dithiol compound of the following formula (II), and their precursors, or at least one compound selected from the group consisting of a ruthenium compound and an osmium compound, is added to the reaction system:

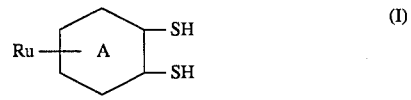
(I)

$$C_mH_{2m-x}R_x(SH)_2 \qquad (II)$$

wherein ring A in the formula (I) is a 6-membered single carbon ring or polycyclic condensed carbon ring aromatic compound, R for $R_n$ in the formula (I) or for $R_x$ in the formula (II) is a mercapto group (—SH), a substituted mercapto group (—SR' wherein R' is a substituent inert in the reaction system), or a substituent substantially inert in the reaction system, m is an integer of from 2 to 4, and n and x are optional integers of from 0 to the maximum number of substitutable positions of the respective compounds other than the positions for the mercapto groups (—SH) (when n and x are 0, the respective formulas represent unsubstituted dithiol compounds).

Now, the present invention will be described in detail with reference to the preferred embodiments.

As the phthalic acid or its derivative to be used in the process of the present invention, any material may be employed so long as it is finally obtained in the form of copper phthalocyanine or its derivative. For example, it may be phthalic acid, phthalic anhydride, phthalimide, a salt such as sodium phthalate, phthalamic acid, phthalonitrile, or a mixture thereof. Such a phthalic acid or its derivative may have a substituent inert in the reaction system, such as an alkyl group, a benzyl group, a cycloalkyl group or a phenyl group.

As the urea or its derivative, urea, biuret or triuret may be mentioned. It is usual to employ urea, which may contain biuret, triuret or the like. The amount of the urea or its derivative usually varies depending upon the type of the phthalic acid or its derivative, but it is usually selected within a range of from 1.5 to 3.5 mols, preferably from 2.0 to 3.0 mols, per mol of the phthalic acid or its derivative.

As the copper compound, copper powder, copper oxide, copper hydroxide, copper sulfate, cuprous chloride, cupric chloride or copper acetate may, for example, be mentioned. However, it is usual to employ a chloride of copper such as cuprous chloride. The amount of the copper compound is selected usually within a range of from 0.2 to 0.3 mols, preferably from 0.23 to 0.27 mols, per mol of the phthalic acid or its derivative.

The molybdenum or the molybdenum compound as the catalyst may, for example, be metal molybdenum, a molybdate such as ammonium molybdate or sodium molybdate, or a molybdenum compound such as ammonium phosphorus molybdate or molybdenum oxide. However, it is usual to employ ammonium molybdate. The amount of the catalyst is usually from 0.003 to 5 wt %, preferably from 0.02 to 0.5 wt %, relative to the phthalic acid or its derivative.

In the present invention, the solvent may be an inert organic solvent which is commonly used for the preparation of copper phthalocyanine by a conventional urea method i.e. a so-called Wyler method, so long as such a solvent is suitable for the purpose of the present invention. For example, an aliphatic hydrocarbon solvent, an aromatic hydrocarbon solvent or a solvent of a nitro-modified aromatic compound type may be mentioned. Specifically, it may, for example, be an inert alkylbenzene type solvent such as diisopropylbenzene, monoisopropylxylene, diisopropyltoluene or tert-amylbenzene, a naphthalene type solvent such as isopropyl naphthalene or tert-butylnaphthalene, or a nitro-modified aromatic solvent such as nitrobenzene or orthonitrotoluene. These solvents may be used alone or in combination as a solvent mixture. Taking into the environmental hygiene and the price into consideration, an aromatic hydrocarbon solvent, particularly an alkylbenzene solvent, is preferred. The amount of the solvent is usually from 1.5 to 7 times by weight, preferably from 1.7 to 3 times by weight, relative to the phthalic acid or its derivative.

Further, by using urea excessively so that it serves also as a solvent, the reaction of the present invention can be carried out in the absence of an organic solvent.

With respect to the reaction conditions for the production of copper phthalocyanine in the present invention, the temperature for the reaction under heating is selected usually within a range of from 140° to 250° C., preferably from 170° to 220° C., and the reaction pressure is selected within a range of from 0 to 20 kg/cm$^2$G, but is preferably within a range of from 2 to 5 kg/cm$^2$G taking into consideration a loss of the solvent as discharged out of the reaction system together with the reaction gas, decomposition of the urea as starting material, decomposition of the phthalic acid or its derivative, a loss out of the system in the form of an intermediate product such as ammonium cyanate, the operation efficiency of the reactor, etc.

The reaction method is carried out in a batch system or a continuous system. After completion of the reaction, the solvent is removed from the reaction product by e.g. distillation under reduced pressure, and the obtained residue is washed with hot water (60° to 80° C.) in an amount of from 3 to 10 times by weight. When a product of a higher purity is required, it is possible to employ a purification method in which the residue obtained after removal of the solvent is washed with dilute sulfuric acid (e.g. from 5 to 10 times by weight).

In the present invention, the dithiol compound to be added to the reaction system is selected from the group consisting of an aromatic dithiol compound of the following formula (I) and a saturated aliphatic dithiol compound of the following formula (II), as mentioned above:

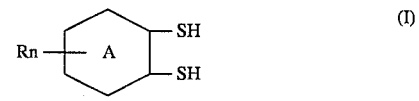

wherein ring A in the formula (I) is a 6-membered single carbon ring or polycyclic condensed carbon ring aromatic compound, R for $R_n$ in the formula (I) or for $R_x$ in the formula (II) is a mercapto group (—SH), a substituted mercapto group (—SR' wherein R' is a substituent inert in the reaction system), or a substituent substantially inert in the reaction system, m is an integer of from 2 to 4, and n and x are optional integers of from 0 to the maximum number of substitutable positions of the respective compounds other than the positions for the mercapto groups (—SH) (when n and x are 0, the respective formulas represent unsubstituted dithiol compounds).

The number of ring A in the formula (I) may be 1 or 2 or more, but is usually 1 or 2. Namely, the compound of the formula (I) is a dithiol compound selected from the group consisting of benzene compounds and naphthalene compounds, each having at least two adjacent mercapto groups. Here, the maximum number of substitutable positions is 4 in the case of benzene compounds and 6 in the case of naphthalene compounds.

The carbon number of the saturated aliphatic dithiol compound of the formula (II) is selected from integers of from 2 to 4, as defined above. This compound is required to have at least two mercapto groups, which are not required to be adjacent to each other, as required in the case of the compound of the formula (I). Namely, they may be bonded to carbon atoms at 1 and 2 positions, 1 and 3 positions, 1 and 4 positions or 2 and 3 positions.

The inert substituent for R in the formula (I) or (II) may, for example, be an alkyl group, a cyclohexyl group, an aralkyl group or an aryl group (each may have an inert substituent), a hydroxyl group, an alkoxyl group or an acyl group. For example, the alkyl group may, for example, be a methyl group, an ethyl group or a propyl group; the cyclohexyl group may, for example, be a cyclohexyl group or a 4-methylcyclohexyl group; the aralkyl group may, for example, be a benzyl group, a phenethyl group or a phenylpropyl group; the aryl group may, for example, be a phenyl group, a toluyl group or a xylyl group; the alkoxyl group may, for example, a methoxyl group, an ethoxyl group or a cyclohexyloxyl group; and the acyl group may, for example, be an acetyl group.

More specifically, the aromatic dithiol compound may, for example, be a 1,2-benzenedithiol compound such as 1,2- benzenedithiol, 3-methyl-1,2-benzenedithiol, 4-methyl-1,2-benzendithiol, 4-ethyl-1,2-benzenedithiol or 1,2,3-benzenetrithiol; or a naphthalenedithiol compound such as 1,2-naphthalenedithiol or 2,3-naphthalenedithiol. The saturated aliphatic compound may, for example, be 1,2-ethanedithiol, 1,3-propanedithiol, 1,4-butanedithiol or 1,4-dimercapto-2,3-butanedithiol.

Further, with a compound having a plurality of inert substituents, such substituents may be the same or different, as in the case of 3,4-dimethyl-1,2-benzenedithiol, 3-methyl-4-ethyl-1,2-benzenedithiol, or 3,4-dimethyl-5-ethyl-1,2-benzenedithiol.

As the dithiol compound to be added in the present invention, a compound which acts substantially in the same manner as the dithiol compound in the reaction system, may likewise be used. In the present invention, such a compound which acts in the same manner as the dithiol compound, is referred to as a precursor. This precursor may, for example, be a salt of the dithiol compound, such as a metal salt such as a sodium, potassium or zinc salt, or an ammonium salt, or a dibenzo[c,g][1,2,5,6]tetrathiocine compound of the formula (III) obtainable by oxidation of the above dithiol compound as shown by the following reaction formula, or an ester of the dithiol compound with an organic acid such as a carboxylic acid such as a diacetic acid ester of 1,2-benzenedithiol, as shown by the formula (IV):

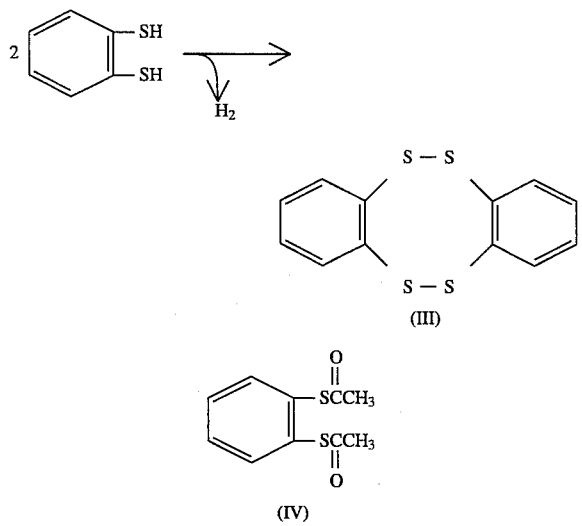

The amount of the dithiol compound is selected within a range of from 0.01 to 5 wt %, preferably from 0.1 to 0.5 wt %, relative to the phthalic acid or its derivative. If the amount is less than 0.01 wt %, no substantial effects will be obtained. On the other hand, even if the amount exceeds 5 wt %, the effects will be the same, and such will be uneconomical.

In the present invention, the ruthenium compound and the osmium compound to be added to the reaction system are not particularly limited in its form, and they may be in the form of oxides, chlorides, bromides, amine complex salts, cyano complexes, carbonyl compounds, complexes with other organic materials, or metal powders.

For example, they may be ruthenium oxide, osmium tetraoxide, osmium dioxide; ruthenium (III) chloride.trihydrate, ruthenium (III) bromide, osmium chloride; ammonium hexachlororuthenate (IV), hexaammineruthenium (III) iodide, potassium hexacyanoruthenate (II).trihydrate; dichlorotris(triphenylphosphine)ruthenium (II), dodecacarbonyl triruthenium (0), chlorohydridocarbonyltris(triphenylphosphine)ruthenium (II), tris(acetylacetonate)ruthenium (III), dichloro(η-1,5-cyclooctadiene)ruthenium (II), formatedicarbonylruthenium (I), tetraphenylporphyrincarbonylruthenium (II); and ruthenium powder, osmium powder. Such ruthenium compounds and osmium compounds may be used alone or in combination as a mixture of two or more of them.

The amount of such a ruthenium compound and/or an osmium compound is usually from 1 to 5,000 ppm, preferably from 5 to 1,000 ppm, more preferably from 10 to 500 ppm, as calculated as the element, relative to the phthalic acid or its derivative. If the amount is less than 1 ppm, no substantial effect will be observed, and if it exceeds 5,000 ppm, the effects will be the same and such excess amount will be uneconomical.

Now, the present invention will be described in further detail with reference to Examples and Comparative Examples. However, it should be understood that the present invention is by no means restricted by such specific Examples. Further, "%" means "wt %" unless otherwise specified. The purity, the free copper content and the numeral values used for the impurities extracted by DMF, were determined by the following measuring methods. Further, a comparison in the quality of pigmentation products by a dry milling method is also shown below.

(1) Measuring Method for the Purity of Copper Phthalocyanine 3.0 g of a sample was accurately weighed and dissolved by an addition of 30.0 g of sulfuric acid. Then, the solution was added to 150 ml of cool water, followed by stirring for 30 minutes at 90° C. Then, the precipitate was collected by filtration, and the obtained cake was washed with hot water until the washing liquid became neutral. Then, it was dried, cooled and then weighed, whereupon the purity was determined by the following formula.

$$\text{Purity} = \frac{\text{Precipitate (g)}}{\text{Sample (g)}} \times 100$$

(2) Measuring Method for the Free Copper Content

The filtrate and the washing liquid obtained in the above measurement for the purity of copper phthalocyanine (1) were put together and cooled to room temperature, whereupon the copper ion concentration in this solution was measured by atomic absorptiometry and represented by the weight percentage (as calculated as metal copper) relative to the sample used.

(3) Measuring Method for Impurities Extracted by DMF (Referred to as DMF Impurities)

10.0 g of copper phthalocyanine was accurately weighed and treated with 100 g of DMF at 140° C. to extract impurities. The insoluble content was filtered off, and then DMF was distilled under reduced pressure, and the obtained residue was regarded as impurities and represented by the weight percent relative to the sample used.

(4) Comparison in the Quality of Pigmentation Products by a Dry Milling Method

In the dry milling method, copper phthalocyanine is firstly dry-pulverized by a ball mill for fine pulverization. At that time, the crystal form of copper phthalocyanine will partially be converted from the β-form to the α-form, to form firm aggregation. Therefore, the product can not be used as a pigment by itself.

Accordingly, the powder is further treated with an organic solvent to convert α-form crystals to the α-form and at the same time to disperse it in the solvent to obtain copper phthalocyanine suitable as a pigment.

Accordingly, in the pigmentation by this method, it is preferred that α-form crystals formed at the time of dry pulverization are little, and the transformation of the α-form to the β-form swiftly proceeds at the time of the treatment with an organic solvent.

The comparison in the quality of the pigmentation products by the dry milling method was carried out as follows.

100 g of copper phthalocyanine was dry-pulverized in a ball mill at 100° C. for 20 hours. Then, it was subjected to stirring treatment at 50° C. with a solvent mixture of ethanol/water (weight ratio of 80/20). With respect to the sample as the time passes during this treatment, the diffraction intensities attributable to the α-form and β-form crystals were measured by powder X-ray diffraction method, and the proportion of the α-form crystals was obtained by percentage, which was used as the index for the quality of the pigmentation product.

(5) Production of Copper Phthalocyanine by an Addition of Dithiols and Pigmentation by a Dry Milling Method

EXAMPLE 1

180 g of phthalimide, 30.3 g of cuprous chloride, 170 g of urea, 0.09 g of ammonium molybdate, 310 g of tertamylbenzene (Hizol P, tradename, manufactured by Nippon Oil Co., Ltd., an alkylbenzene mixture) as a solvent and 0.36 g of 1,2-benzenedithiol as the dithiol compound, were charged into a 1 l glass autoclave and reacted for 3.5 hours under a pressure of 2.5 kg/cm$^2$G while gradually raising the reaction temperature from 170° C. to 210° C. From the formed slurry, the solvent was distilled off under a reduced pressure of 5 mmHg at 175° C. for 3 hours.

To the residue, 1,200 g of water was added, and the mixture was stirred at 60° C. for 2 hours for hot water washing and subjected to filtration. The cake thereby obtained was washed with 800 g of hot water of 60° C. and dried to obtain 175 g of copper phthalocyanine (such a product washed with hot water will hereinafter be referred to as "a hot water-washed product"). The amount of the DMF impurities in this hot water-washed product was 1.3%, and the free copper was 0.48%.

On the other hand, the above residue was subjected to slurry washing with 1,200 g of 1% dilute sulfuric acid at 60° C. for 2 hours and subjected to filtration. Then, it was washed with hot water of 60° C. until no acid was detected in the washing water, and dried to obtain 172 g of copper phthalocyanine (such a product washed with dilute sulfuric acid will hereinafter be referred to as "an acid-washed product"). The amount of the DMF impurities in this acid-washed product was 0.5%, and the free copper was 0.09%. The test results on the quality of pigmentation products of such hot water-washed product and acid-washed product by a dry milling method are shown in Tables 1 and 2.

COMPARATIVE EXAMPLE 1

The operation was conducted in the same manner as in Example 1 except that 1,2-benzenedithiol was not added, to obtain 176 g of copper phthalocyanine as a hot water-washed product. The amount of the DMF impurities in this hot water-washed product was 3.9%, and the free copper was 0.70%.

On the other hand, as an acid-washed product, 173 g of copper phthalocyanine was obtained. The amount of the DMF impurities in this product was 1.9%, and the free copper was 0.28%.

The test results on the quality of pigmentation products of such water-washed product and acid-washed product by a dry milling method are shown in Tables 1 and 2.

EXAMPLES 2 to 9

The operation was conducted in the same manner as in Example 1 except that the dithiol compound added was changed, and the results are shown in Tables 1 and 2.

TABLE 1

| | Added dithiol compound | | Hot water-washed product | | | | |
|---|---|---|---|---|---|---|---|
| | | | DMF impurities (%) | Free copper (%) | Proportion (%) of the α-form as the time passes during dry milling treatment Time passed (hr) | | |
| No. | Type | Amount relative to the phthalic acid or its derivative | | | 0 | 1 | 4 |
| Example 2 | 4-Methyl-1,2-benzenedithiol | 0.3 | 1.7 | 0.50 | 24 | 13 | 5 |
| Example 3 | 1,2,3-Benzenetrithiol | 0.2 | 1.2 | 0.50 | 20 | 10 | 5 |
| Example 4 | 2,3-Naphthalenedithiol | 0.3 | 1.3 | 0.48 | 21 | 12 | 6 |
| Example 5 | Dibenzo[c,g] [1,2,5,6]-tetrathiocine | 0.2 | 1.3 | 0.47 | 21 | 12 | 6 |
| Example 6 | 1,2-Benzenedithiol diacetate | 0.4 | 1.3 | 0.47 | 21 | 10 | 7 |
| Example 7 | 1,2-Ethanedithiol | 0.5 | 2.2 | 0.51 | 24 | 14 | 11 |
| Example 8 | 1,3-Butanedithiol | 0.5 | 2.2 | 0.51 | 25 | 14 | 11 |
| Example 9 | 1,4-Dimercapto-2,3-butanediol | 0.5 | 2.3 | 0.53 | 26 | 15 | 13 |
| Comparative Example 1 | Nil | — | 3.9 | 0.70 | 33 | 25 | 18 |

TABLE 2

| No. | Added dithiol compound Type | Added dithiol compound Amount relative to the phthalic acid or its derivative | Acid-washed product DMF impurities (%) | Acid-washed product Free copper (%) | Proportion (%) of the α-form as the time passes during dry milling treatment Time passed (hr) 0 | 1 | 4 |
| --- | --- | --- | --- | --- | --- | --- | --- |
| Example 1 | 1,2-Benzenedithiol | 0.2 | 0.5 | 0.09 | 12 | <1 | <1 |
| Example 2 | 4-Methyl-1,2-benzenedithiol | 0.3 | 0.6 | 0.10 | 13 | <1 | <1 |
| Example 3 | 1,2,3-Benzenetrithiol | 0.2 | 0.5 | 0.09 | 11 | <1 | <1 |
| Example 4 | 2,3-Naphthalenedithiol | 0.3 | 0.6 | 0.11 | 13 | 1 | <1 |
| Example 5 | Dibenzo[c,g] [1,2,5,6]-tetrathiocine | 0.2 | 0.5 | 0.10 | 12 | <1 | <1 |
| Example 6 | 1,2-Benzenedithiol diacetate | 0.4 | 0.5 | 0.09 | 13 | <1 | <1 |
| Example 7 | 1,2-Ethanedithiol | 0.5 | 1.0 | 0.12 | 17 | 6 | 1 |
| Example 8 | 1,3-Butanedithiol | 0.5 | 0.9 | 0.11 | 18 | 5 | 1 |
| Example 9 | 1,4-Dimercapto-2,3-butanediol | 0.5 | 1.0 | 0.15 | 19 | 8 | 3 |
| Comparative Example 1 | Nil | — | 1.9 | 0.28 | 26 | 16 | 9 |

EXAMPLE 10

The operation was conducted in the same manner as in Example 1 except that nitrobenzene was used as the solvent for the reaction, to obtain 175 g of copper phthalocyanine as a hot water-washed product. The amount of the DMF impurities in this product was 1.4%, and the free copper was 0.2%. The results of the quality of the pigmentation product of this hot water-washed product by a dry milling method are shown in Table 3.

COMPARATIVE EXAMPLE 2

The operation was conducted in the same manner as in Example 10 except that 1,2-benzenedithiol was not added, to obtain 174 g of copper phthalocyanine as a hot water-washed product. The amount of the DMF impurities in this product was 2.5%, and the free copper was 0.28%. The results on the quality of pigmentation product of this hot water-washed product by a dry milling method are shown in Table 3.

added as abrasive to copper phthalocyanine, and diethylene glycol or the like is further added, followed by pigmentation by a kneader in a wet system.

A comparison in the quality of pigmentation products by this method was carried out with respect to the sample of Example 1 (which will be Example 11) and the sample of Comparative Example 1 (which will be Comparative Example 3) as follows.

100 g of a hot water-washed product, 700 g of sodium chloride (finely pulverized product for pigmentation) and 125 g of diethylene glycol were charged into a 3 l double arm type kneader and kneaded at 90° to 95° C., whereby 10 g of a sample was collected upon expiration of 2 hours, 4 hours and 6 hours. Each collected sample was subjected to slurry washing with 500 ml of 3% sulfuric acid at 70° C. for 2 hours and then subjected to filtration. Then, the cake was washed with hot water of 70° C. until the filtration became neutral. This cake was dried at 70° C. for 24 hours to obtain a pigmentation product.

TABLE 3

| Example No. | Added dithiol compound Type | Added dithiol compound Amount relative to the phthalic acid or its derivative (%) | Hot water-washed product DMF impurities (%) | Hot water-washed product Free copper (%) | Proportion (%) of the α-form as the time passed during dry milling treatment Time passed (hr) 0 | 1 | 4 |
| --- | --- | --- | --- | --- | --- | --- | --- |
| Example 10 | 1,2-Benzenedithiol | 0.2 | 1.4 | 0.20 | 9 | 2 | <1 |
| Comparative Example 2 | Nil | — | 2.5 | 0.28 | 10 | 7 | 5 |

(6) Comparison in the Quality of Pigmentation Products by a Salt Grinding Method

EXAMPLE 11 and COMPARATIVE EXAMPLE 3

The above-described dry milling method is a typical example of a pigmentation method of copper phthalocyanine. As another typical pigmentation method, a salt grinding method may be mentioned. This pigmentation method is a method wherein finely pulverized sodium chloride is To evaluate the quality of this pigmentation product, 0.10 g of the pigmentation product was dispersed in 0.40 g of varnish and 12.5 g of white extender by means of a Hoover's muller and spreaded on a white paper sheet.

The reflection spectrum of the spreaded product was measured by a color difference meter, whereby L (lightness) and C (chroma) were determined.

The values of these L and C were measured by Hunter's "L.a.b" system in accordance with National Bureau of Standard, U.S.A. and represented by the absolute values of coloring matters.

The smaller the value of L, the stronger the tinting force. The larger the value for C (calculated by the following formula), the higher the clearness.

$$C = \sqrt{a^2 + b^2}$$

The results of such measurement are shown in Table 4. As is evident from Table 4, the tinting force is substantially the same, but with respect to clearness, the product of Example 11 prepared by an addition of 1,2-benzenedithiol is superior.

.trihydrate, 0.15 g (390 ppm as a ruthenium element relative to phthalimide) of dodecacarbonyl triruthenium (0) was used. As a result, 170 g of copper phthalocyanine was obtained as a hot water-washed product. The amount of the DMF impurities in this hot water-washed product was 2.0%, and the free copper was 0.26%. The purity was 98.4%.

On the other hand, as an acid-washed product, 168 g of copper phthalocyanine was obtained. The amount of the DMF impurities was 0.9%, and the free copper was 0.12%. The purity was 99.0%.

EXAMPLE 14

The operation was conducted in the same manner as in Example 12 except that instead of ruthenium (III) chloride-

TABLE 4

| Example No. | Added dithiol compound | | Quality of pigmentation product by a salt grinding method | | | | | |
|---|---|---|---|---|---|---|---|---|
| | | | L value | | | C value | | |
| | | | Kneading time (hr) | | | Kneading time (hr) | | |
| | Type | Amount relative to the phthalic acid or its derivative (%) | 2 | 4 | 6 | 2 | 4 | 6 |
| Example 11 | 1,2-Benzenedithiol | 0.2 | 34.8 | 34.8 | 34.7 | 53.6 | 54.1 | 54.2 |
| Comparative Example 3 | Nil | — | 34.8 | 34.8 | 34.8 | 52.8 | 52.8 | 52.8 |

(7) Production of Copper Phthalocyanine by an Addition of a Ruthenium or Osmium Compound and Pigmentation by a Dry Milling Method

EXAMPLE 12

180 g of phthalimide, 29.1 g of cuprous chloride (96% of the stoichiometrical amount required for the chemical reaction), 170 g of urea, 0.09 g of ammonium molybdate, 310 g of tert-amylbenzene (Hizol P, tradename, manufactured by Nippon Oil Co., Ltd., an alkylbenzene mixture) as a solvent and 0.18 g (390 ppm as a ruthenium element relative to phthalimide) of ruthenium (III) chloride.trihydrate, were charged into a 1 l glass autoclave and reacted for 3.5 hours under a pressure of 2.5 kg/cm²G while raising the reaction temperature from 170° to 210° C. From the formed slurry, the solvent was distilled off under a reduced pressure of 5 mmHg at 175° C. over a period of 3 hours.

To this residue, 1,200 g of water was added, and the mixture was stirred at 60° C. for 2 hours and then washed with hot water and subjected to filtration. Then, the cake was washed with 800 g of hot water at 60° C. and dried to obtain 170 g of copper phthalocyanine (hot water-washed product). The amount of the DMF impurities in this product was 1.9%, and the free copper (unreacted copper) was 0.25%. The purity was 98.4%.

On the other hand, the above residue was subjected to slurry washing at 60° C. for 2 hours with 1,200 g of 1% dilute sulfuric acid, and then washed with 2,000 g of hot water of 60° C. until no acid was detected in the washing water, to obtain 168 g of copper phthalocyanine (acid-washed product). The amount of the DMF impurities in the obtained acid-washed product was 0.9%, and the free copper (unreacted copper) was 0.13%. The purities was 98.9%. The results of Example 12 are shown in Table 5.

EXAMPLE 13

The operation was conducted in the same manner as in Example 12 except that instead of ruthenium (III) chloride- .trihydrate, 0.68 g (390 ppm as a ruthenium element relative to the phthalimide) of dichlorotris(triphenylphosphine)ruthenium (II) was used. As a result, 170 g of copper phthalocyanine was obtained as a hot water-washed product. The amount of the DMF impurities was 1.7%, and the free copper was 0.24%. The purity was 98.5%.

On the other hand, as an acid-washed product, 168 g of copper phthalocyanine was obtained. The amount of the DMF impurities was 0.8%, and the free copper was 0.13%. The purity was 98.9%.

EXAMPLE 15

The operation was conducted in the same manner as in Example 12 except that instead of ruthenium (III) chloride-.trihydrate, 0.1 g (360 ppm as an osmium compound relative to the phthalimide) of osmium (III) chloride, was used. As a result, 169 g of copper phthalocyanine was obtained as a hot water-washed product. The amount of the DMF impurities was 1.7%, and the free copper was 0.28%. The purity was 98.3%.

On the other hand, as an acid-washed product, 168 g of copper phthalocyanine was obtained. The amount of the DMF impurities was 0.8%, and the free copper was 0.11%. The purity was 99.1%.

COMPARATIVE EXAMPLE 4

The operation was conducted in the same manner as in Example 12 except that ruthenium (III) chloride.trihydrate was not added. As a result, 170 g of copper phthalocyanine was obtained as a hot water-washed product. The amount of the DMF impurities was 3.2%, and the free copper was 0.35%. Further, the purity was 98.2%.

On the other hand, as an acid-washed product, 167 g of copper phthalocyanine was obtained. The amount of the DMF impurities was 1.7%, and the free copper was 0.23%. Further, the purity was 98.9%.

The results of Examples 12 to 15 and Comparative Example 4 are shown in Table 5.

TABLE 5

| | Ruthenium or osmium compound | | Hot water-washed product | | Acid-washed product | |
|---|---|---|---|---|---|---|
| | | | DMF | | DMF | |
| Example No. | Type | Amount relative to the phthalic acid or its derivative (ppm*[1]) | impurities (%) | Free copper (%) | impurities (%) | Free copper (%) |
| Example 12 | $RuCl_3 \cdot 3H_2O$ | 390 | 1.9 | 0.25 | 0.9 | 0.13 |
| Example 13 | $Ru_3(CO)_{12}$ | 390 | 2.0 | 0.26 | 0.9 | 0.12 |
| Example 14 | $RuCl_2(PPh_3)_3$ | 390 | 1.7 | 0.24 | 0.8 | 0.13 |
| Example 15 | $OsCl_3$ | 360 | 1.7 | 0.28 | 0.8 | 0.11 |
| Comparative Example 4 | Nil | — | 3.2 | 0.35 | 1.7 | 0.23 |

*[1]The amount of the ruthenium or osmium element relative to the phthalic acid or its derivative (the applies hereinafter)

Comparison in the Quality of the Pigmentation Products by a Dry Milling Method With respect to the hot water-washed product of Example 12 and the hot water-washed product of Comparative Example 4, a comparison in the quality of pigmentation by a dry milling method was carried out. The results are shown in Table 6. It is evident from Table 6 that with the sample of Example 12, the α-form production rate due to dry pulverization is less, and the transformation from the α-form to the β-form by solvent treatment is swift, thus indicating that the quality is high.

TABLE 6

| | Ruthenium compound | | | Proportion (%) of the α-form as the time passes during dry milling treatment | | |
|---|---|---|---|---|---|---|
| | | Amount relative to the phthalic | DMF impurities | Time passed (hr) | | |
| Example No. | Type | acid or its derivative (ppm) | (%) | 0 | 1 | 4 |
| Example 12 (hot water-washed products) | $RuCl_3 \cdot 3H_2O$ | 390 | 1.9 | 24 | 10 | 7 |
| Comparative Example 4 (hot water-washed products) | Nil | — | 3.2 | 38 | 29 | 24 |

EXAMPLE 16

The operation was conducted by adding 0.18 g of ruthenium (III) chloride.trihydrate in the same manner as in Example 12 except that cuprous chloride was employed in an amount of 30.3 g (100% of the stoichiometrical amount required for the chemical reaction). As a result, 175 g of copper phthalocyanine was obtained as a hot water-washed product. The amount of the DMF impurities in this hot water-washed product was 2.2%, and the free copper (unreacted copper) was 0.44%. The purity was 97.8%.

On the other hand, as an acid-washed product, 173 g of copper phthalocyanine was obtained. The amount of the DMF impurities was 1.1%, and the free copper (unreacted copper) was 0.16%. The purity was 98.9%. The results of this Example 16 are shown in Table 7.

EXAMPLE 17

The operation was conducted in the same manner as in Example 16 except that instead of ruthenium (III) chloride- .trihydrate, 0.15 g (390 ppm as a ruthenium element relative to the phthalimide) of dodecacarbonyl triruthenium (0) was used. As a result, 176 g of copper phthalocyanine was obtained as a hot water-washed product. The amount of the DMF impurities in this hot water-washed product was 2.3%, and the free copper was 0.45%. The purity was 97.7%.

On the other hand, as an acid product, 174 g of copper phthalocyanine was obtained. The amount of the DMF impurities was 1.1%, and the free copper was 0.17%. The purity was 98.9%.

EXAMPLE 18

The operation was conducted in the same manner as in Example 16 except that instead of ruthenium (III) chloride- .trihydrate, 0.68 g (390 ppm as a ruthenium element relative to the phthalimide) of dichlorotris(triphenylphosphine)ruthenium (II) was used. As a result, 176 g of copper phthalocyanine was obtained as a hot water-washed product. The amount of the DMF impurities was 2.1%, and the free copper was 0.46%. The purity was 97.7%.

On the other hand, as an acid-washed product, 174 g of copper phthalocyanine was obtained. The amount of the DMF impurities was 1.2%, and the free copper was 0.16%. The purity was 98.9%.

EXAMPLE 19

The operation was conducted in the same manner as in Example 16 except that instead of ruthenium (III) chloride- .trihydrate, 0.1 g (420 ppm as an osmium element relative to the phthalimide) of osmium (VIII) tetraoxide was used. As a result, 175 g of copper phthalocyanine was obtained as a hot water-washed product. The amount of the DMF impurities was 1.9%, and the free copper was 0.43%. The purity was 97.9%.

On the other hand, as an acid-washed product, 173 g of copper phthalocyanine was obtained. The amount of the DMF impurities was 1.0%, and the free copper was 0.14%. The purity was 99.1%.

The results of Examples 16 to 19 and Comparative Example 1 are shown in Table 7.

TABLE 7

| | Ruthenium or osmium compound | | Hot water-washed product | | Acid-washed product | |
|---|---|---|---|---|---|---|
| | | | DMF | | DMF | |
| Example No. | Type | Amount relative to the phthalic acid or its derivative (ppm*¹) | impurities (%) | Free copper (%) | impurities (%) | Free copper (%) |
| Example 16 | RuCl₃.3H₂O | 390 | 2.2 | 0.44 | 1.1 | 0.16 |
| Example 17 | Ru₃(CO)₁₂ | 390 | 2.3 | 0.45 | 1.1 | 0.17 |
| Example 18 | RuCl₂(PPh₃)₃ | 390 | 2.1 | 0.46 | 1.2 | 0.16 |
| Example 19 | OsO₄ | 420 | 1.9 | 0.43 | 1.0 | 0.14 |
| Comparative Example 1 | Nil | — | 3.9 | 0.70 | 1.9 | 0.28 |

Comparison in the Quality of Pigmentation Products by a Dry Milling Method

With respect to the hot water-washed product of Example 16, the quality of the pigmentation product by a dry milling method was investigated and compared with the hot water-washed product of Comparative Example 1. The results are shown in Table 8. It is evident from Table 8 that with the hot water-washed product of Example 16, the α-form production rate due to dry pulverization is less, and the transformation from the α-form to the β-form by solvent treatment is swift, thus indicating that the quality is high.

TABLE 8

| | Ruthenium compound | | | Proportion (%) of the α-form as the time passes during dry milling treatment | | |
|---|---|---|---|---|---|---|
| | | Amount relative to the phthalic | DMF impurities | Time passed (hr) | | |
| Example No. | Type | acid or its derivative (ppm) | (%) | 0 | 1 | 4 |
| Example 16 (hot water-washed products) | RuCl₃.3H₂O | 390 | 2.2 | 24 | 9 | 8 |
| Comparative Example 1 (hot water-washed products) | Nil | — | 3.9 | 33 | 25 | 18 |

The copper phthalocyanine obtained by the method of the present invention has a feature that it is possible to obtain a product containing little free copper and impurities which hinder industrial treatment such as pigmentation. Especially, (1) the transformation rate of the crystal form can be improved in the solvent treatment for pigmentation by a dry milling method. By the improvement of this transformation rate, the time for the pigmentation treatment can be shortened, whereby the production costs can be substantially reduced. (2) The free copper being little provides an industrial effect such that a load in the copper ion treatment at the time of treating the discharged waste liquid, can be reduced in the pigmentation treatment with sulfuric acid or the like.

What is claimed is:

1. A method for producing copper phthalocyanine, which comprises heating and reacting phthalic acid or a phthalic acid derivative, urea or a urea derivative, and a copper compound, using molybdenum or a molybdenum compound as a catalyst, in the presence or absence of an inert organic solvent, wherein at least one compound selected from the group consisting of an aromatic dithiol compound of the following formula (I), a saturated aliphatic dithiol compound of the following formula (II), and their precursors, or at least one compound selected from the group consisting of a ruthenium compound and an osmium compound, is added to the reaction system:

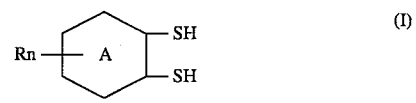

chloride-trihydrate, 0.15 g (390 ppm as a ruthenium wherein ring A in the formula (I) is a 6-membered single carbon ring or polycyclic condensed carbon ring aromatic compound, R for $R_n$ in the formula (I) or for $R_x$ in the formula (II) is a mercapto group (—SH), a substituted mercapto group (—SR' wherein R' is a substituent inert in the reaction system), or a substituent substantially inert in the reaction system, m is an integer of from 2 to 4, and n and x are optional integers of from 0 to the maximum number of substitutable positions of the respective compounds other than the positions for the mercapto groups (—SH) (when n and x are 0, the respective formulas represent unsubstituted dithiol compounds).

2. The method according to claim 1, wherein the compound of the formula (I) is at least one dithiol compound selected from the group consisting of a 1,2-benzenedithiol compound, a 1,2-naphthalenedithiol compound and a 2,3- naphthalenedithiol compound, or the compound of the formula (II) is at least one dithiol compound selected from the group consisting of a 1,2-ethanedithiol compound, a 1,2-propanedithiol compound, a 1,2-butanedithiol compound, a 1,3-propanedithiol compound, a 1,3-butanedithiol compound and a 1,4-butanedithiol compound.

3. The method according to claim 1, wherein the inert substituent for R in the formula (I) or (II) is an alkyl group, a cyclohexyl group, an aralkyl group or an aryl group (each may have an inert substituent), a hydroxyl group, an alkoxyl group or an acyl group.

4. The method according to claim 1, wherein the dithiol compound is added to the reaction system in an amount of from 0.01 to 5 wt % relative to the phthalic acid or its derivative.

5. The method according to claim 1, wherein said at least one compound selected from the group consisting of a ruthenium compound and an osmium compound is added in an amount of from 1 to 5,000 ppm (as calculated as ruthenium and osmium elements relative to the phthalic acid or its derivative).

6. The method according to claim 1, wherein said at least one compound selected from the group consisting of a ruthenium compound and an osmium compound is added in an amount of from 5 to 1,000 ppm (as calculated as ruthenium and osmium elements relative to the phthalic acid or its derivative).

7. The method according to claim 1, wherein the inert organic solvent is a solvent of a hydrocarbon type.

8. The method according to claim 1, wherein the copper phthalocyanine thereby obtained is a product to be used for a pigmentation step.

9. The method according to claim 8, wherein the pigmentation step is a dry milling step.

* * * * *